United States Patent
Lee

(10) Patent No.: US 8,037,368 B2
(45) Date of Patent: Oct. 11, 2011

(54) CONTROLLER CAPABLE OF SELF-MONITORING, REDUNDANT STORAGE SYSTEM HAVING THE SAME, AND METHOD THEREOF

(75) Inventor: Cheng-Yu Lee, Chungho (TW)

(73) Assignee: Infortrend Technology Inc., Taipei Hsien (TW)

( * ) Notice: Subject to any disclaimer, the term of this patent is extended or adjusted under 35 U.S.C. 154(b) by 331 days.

(21) Appl. No.: 11/177,341

(22) Filed: Jul. 11, 2005

(65) Prior Publication Data

US 2006/0010351 A1 Jan. 12, 2006

Related U.S. Application Data

(60) Provisional application No. 60/521,854, filed on Jul. 12, 2004.

(51) Int. Cl.
*G06F 11/00* (2006.01)
(52) U.S. Cl. .......... 714/56; 714/5.11; 714/6.21
(58) Field of Classification Search .......... 714/5, 7, 714/8, 9, 55, 56, 5.11, 6.13, 6.21
See application file for complete search history.

(56) References Cited

U.S. PATENT DOCUMENTS

| | | | |
|---|---|---|---|
| 5,975,738 A * | 11/1999 | DeKoning et al. | 700/79 |
| 6,085,333 A * | 7/2000 | DeKoning et al. | 714/7 |
| 6,345,368 B1 * | 2/2002 | Bergsten | 714/11 |
| 6,487,680 B1 * | 11/2002 | Skazinski et al. | 714/23 |
| 6,754,853 B1 * | 6/2004 | DeKoning et al. | 714/42 |
| 6,802,023 B2 * | 10/2004 | Oldfield et al. | 714/7 |
| 6,983,397 B2 * | 1/2006 | Fairhurst et al. | 714/9 |
| 7,290,170 B2 * | 10/2007 | Anderson et al. | 714/11 |
| 7,293,198 B2 * | 11/2007 | Strickland et al. | 714/15 |
| 2002/0133744 A1 * | 9/2002 | Oldfield et al. | 714/11 |
| 2004/0193737 A1 * | 9/2004 | Huffman et al. | 710/1 |

* cited by examiner

*Primary Examiner* — Joshua Lohn
(74) *Attorney, Agent, or Firm* — Birch, Stewart, Kolasch & Birch, LLP

(57) ABSTRACT

A controller capable of self-monitoring, a redundant storage system having the same, and its method are proposed. Each controller is arranged with a self-monitoring operating circuit and a watchdog unit. The self-monitoring operating circuit can periodically issue a confirmation signal to the watchdog unit. The watchdog unit comprises a counter unit for counting a predetermined time interval, and if it does not receive the confirmation signal issued by the self-monitoring operating circuit over the predetermined time interval, it will send out an output signal to the self-monitoring operating circuit. The self-monitoring operating circuit will then generate a plurality of global reset signals to shut down the entire operation of the controller. Another controller will take over the functions of the shut-down controller.

25 Claims, 5 Drawing Sheets

ABLE OF
CONTROLLER CAPABLE OF SELF-MONITORING, REDUNDANT STORAGE SYSTEM HAVING THE SAME, AND METHOD THEREOF

CROSS-REFERENCE TO RELATED APPLICATION

This application claims the priority benefit of U.S. Provisional Application Ser. No. 60/521,854, filed on Jul. 12, 2004, the full disclosures of which are incorporated herein by reference.

BACKGROUND OF THE INVENTION

1. Field of the Invention

The present invention is related to a controller used in a storage field, and more particularly, to a controller capable of self-monitoring, a redundant storage system having the same, and a method thereof.

2. Description of Related Art

A redundant system means a system includes two or more particular sub-systems which is important to the system. For example, a redundant RAID (redundant arrays of independent disks) system often seen in the storage field usually has two redundant controllers. The controllers can be arranged in two kinds of configuration. One is Active-Standby, also called Active-Passive while the other is Active-Active.

Reference is made to FIG. 1, which is a schematic diagram showing the redundant controller pair in Active-Passive configuration. It has a host 11, controllers 121, 122, and a physical storage device array (PSD array) 13. Examples of a PSD are a hard disk drive or an optical disc. The controller 121 is called primary controller while the controller 122 is called secondary controller. The controllers 121, 122 are connected to at least one host 11. Thus, the host 11 can issue access requests to the controller 121 or 122.

Normally, the host 11 sends an access request to the controller 121 so as to access data stored in the PSD array 13 via the controller 121. Before the controller 121 accesses the PSD array 13, it informs the controller 122 of what it is going to do. For example, the controller 121 may inform the controller 122 that it is going to write some data into the PSD array 13. After that, the controller 122 backs up the data and records the action the controller 122 is going to perform.

Once the controller 121 fails or performs an error action, the controller 122 takes over the task of the controller 121 to write the data into the PSD array 13. Hence, when the controller 121 is broken, the controller 122 temporarily serves as the primary controller. The host 11 sends access requests to the controller 122, instead, until the controller 121 is restored or replaced by a new one.

Reference is made to FIG. 2, which is a schematic diagram showing the redundant controller pair in Active-Active configuration. It has a host 21, controllers 221, 222, and a PSD array 23. The controller 221 is called primary controller while the controller 222 is called secondary controller. The controllers 221, 222 are connected to at least one host 21. Thus, the host 21 can issue access requests to the controllers 221 and 222. The controllers 221 and 222 access the PSD array 23 respectively according to the access requests they receive.

Before the controller 221 accesses the PSD array 23, it informs the controller 222 of what it is going to do. Similarly, before the controller 222 accesses the PSD array 23, it also informs the controller 221 of what it is going to do. Hence, if one of the controllers 221 and 222 fails or performs an error action, the other temporarily takes over its task and completes the access action.

In either configuration mentioned above, i.e., Active-Active configuration or Active-Standby configuration, there must be a monitoring mechanism between the redundant controllers so that any one of the controllers can detect whether the other one operates abnormally. Reference is made to FIG. 3, which shows a schematic diagram for illustrating the monitoring mechanism between the redundant controller pair. It includes controllers 31, 32, a PSD array 33 and a common transmission interconnect 34. The controller 31 is called the primary controller while the controller 32 is called the secondary controller.

If the common transmission interconnect 34 is a small computer system interface (SCSI) interconnect, whose transmission cable has many pins, for example, 68 pins, a portion of which are unused generally, the controllers 31, 32 can employ the unused pins of the SCSI's transmission cable to send monitoring signals to each other. In this way, either one of the controllers 31, 32 can detect whether the other one operates abnormally.

For example, if the controller 31 malfunctions, the monitoring signals sent from the controller 32 cannot be replied to. So the controller 32 notifies the host (not shown) that the controller 31 is malfunctioning and temporarily takes over the functions of the controller 31.

In addition, the controllers 31, 32 access the PSD array 33 through the common transmission interconnect 34. If one of the controllers 31, 32 operates abnormally, it may abnormally access the data of the PSD array 33 and affect other normal access operations. Hence, for example, when the controller 31 finds that the controller 32 operates abnormally, it sends a reset signal to the controller 32 to reset the same so as to prevent the whole storage system from being affected by the abnormal operation.

Furthermore, if the controller 31 malfunctions and the other controller 32 does not take over its functions immediately, the host may still send access requests to the controller 31 and not receive any response. Thus, the controllers 31, 32 have to monitor each other via the common transmission interconnect 34, and the interval between any two monitoring signals sent from the controller 31 or 32 must be very short, such as several milliseconds.

A conventional monitoring signal includes multiple detecting signals. When the controller 31 or 32 receives the detecting signals, they perform a hand-shaking action. This action occupies a portion of transmission bandwidth of the common transmission interconnect 34 and degrades the efficiency of the access operations of the controllers 31 and 32. For resolving this problem, an additional transmission interface can be provided for conveying the monitoring signals of the controllers 31 and 32. However, it increases the cost and overall hardware complexity.

SUMMARY OF THE INVENTION

An objective of the present invention is to provide a controller capable of self-monitoring to reduce the bandwidth occupation of the common transmission interconnect due to the monitoring signals communicating thereon, a redundant storage system having the same, and a method thereof.

Another objective of the present invention is to provide a controller capable of self-monitoring so as to shut down itself automatically when it operates abnormally, a redundant storage system having the same, and a method thereof.

According to one embodiment, the present invention provides a redundant storage system having a self-monitoring function. It includes multiple controllers, each of which performs the self-monitoring function via a self-monitoring device, and at least one common transmission interconnect connected to the controllers. When one of the controllers' self-monitoring device generates a first output signal, the corresponding controller is shut down.

According to another embodiment, the present invention provides a redundant storage system having a self-monitoring function. It includes multiple controllers, each of which has a self-monitoring operating circuit and a watchdog unit for providing the self-monitoring function, and at least one common transmission interconnect connected to the controllers. Each of the self-monitoring operating circuits periodically sends a confirmation signal to a corresponding one of the watchdog units. When one of the controllers' watchdog units does not receive the confirmation signal sent from the self-monitoring operating circuit corresponding thereto over a predetermined period of time, the watchdog unit provides a first output signal for the corresponding self-monitoring operating circuit to shut down the corresponding controller.

According to another embodiment, the present invention provides a controller having a self-monitoring function and used in a storage system that has a second controller, at least one host, and at least one storage medium. The controller is connected to the second controller via a common transmission interconnect. The controller includes a self-monitoring operating circuit and a watchdog unit connected to the self-monitoring operating circuit and used for counting a predetermined period of time. The self-monitoring operating circuit periodically sends a confirmation signal to the watchdog unit. If the watchdog unit does not receive the confirmation signal over the predetermined period of time, the watchdog unit provides a first output signal for the self-monitoring operating circuit to shut down the controller.

According to another embodiment, the present invention provides a self-monitoring method of a controller. The controller has a self-monitoring operating circuit and a watchdog unit. The self-monitoring method comprises the following steps. The self-monitoring operating circuit sends a confirmation signal to the watchdog unit periodically; the watchdog unit counts a predetermined period of time, and the watchdog unit will send a first output signal to the self-monitoring operating circuit if the watchdog unit does not receive the confirmation signal over the predetermined period of time; and the self-monitoring operating circuit generates multiple reset signals in response to the first output signal to shut down the controller.

According to another embodiment, the present invention provides a self-monitoring method used in a redundant storage system having multiple controllers. The controllers are connected to at least one storage medium. Each of the controllers has a self-monitoring operating circuit and a watchdog unit. The self-monitoring method is applied for each of the controllers and includes the following steps. The self-monitoring operating circuit sends a confirmation signal to the watchdog unit periodically; the watchdog unit counts a predetermined period of time, and the watchdog unit will send a first output signal to the self-monitoring operating circuit if the watchdog unit does not receive the confirmation signal over the predetermined period of time; and, the self-monitoring operating circuit generates multiple reset signals in response to the first output signal to shut down the corresponding controller.

According to another embodiment, the present invention provides a redundant storage system. It includes at least one host, multiple controllers connected to the host, and a PSD array connected to the controllers via a common transmission interconnect. Each of the controllers has a self-monitoring operating circuit and a watchdog unit. The self-monitoring operating circuit periodically sends a confirmation signal to the watchdog unit. If the watchdog unit does not receive the confirmation signal over a predetermined period of time, the watchdog unit provides a first output signal for the self-monitoring operating circuit to shut down the corresponding controller.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

The present invention provides a watchdog unit (WDU) for each controller. The controller performs a self-monitoring function via the watchdog unit. The controller includes a self-monitoring operating circuit, which periodically sends a confirmation signal to inform the watchdog unit that the controller operates normally. If the self-monitoring operating circuit does not send the confirmation signal to the watchdog unit over a predetermined period of time, the watchdog unit sends a watchdog reset signal to the self-monitoring operating circuit. After the watchdog reset signal is received, the self-monitoring operating circuit generates multiple reset signals to shut down the controller. With the self-monitoring function, the controller does not need to send the monitoring signals via the common transmission interconnect and thus the occupation of the common transmission interconnect is reduced.

In the following embodiment, the self-monitoring operating circuit can be disposed in a central processing circuit including a central processing unit (CPU) and an application specific integrated circuit (ASIC). The self-monitoring operating circuit can be disposed in the ASIC of the central processing circuit. Furthermore, the self-monitoring operating circuit can also be a microprocessor or a similar circuit or device that can periodically send the confirmation signal to the watchdog unit.

Figure 1:
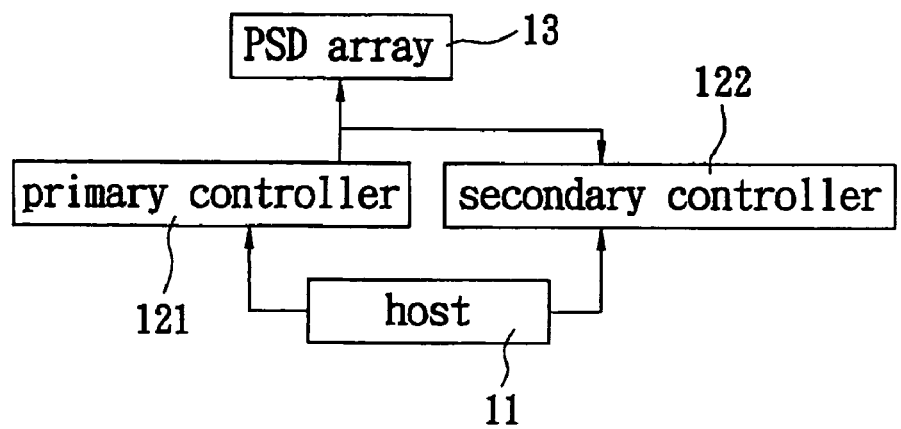
FIG. 1 is a schematic diagram showing the controllers in Active-Passive configuration according to the prior art.
Figure 2:
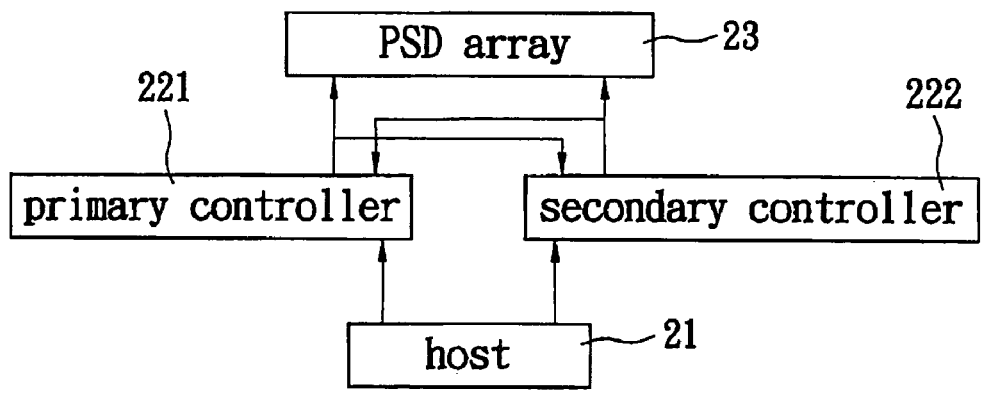
FIG. 2 is a schematic diagram showing the controllers in Active-Active configuration according to the prior art.
Figure 3:
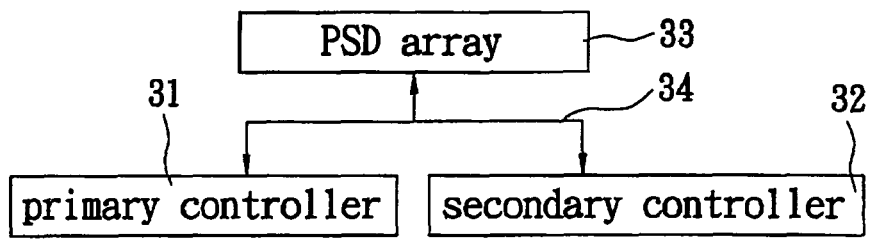
FIG. 3 shows a schematic diagram for illustrating the monitoring mechanism between the controllers according to the prior art.
Figure 4:
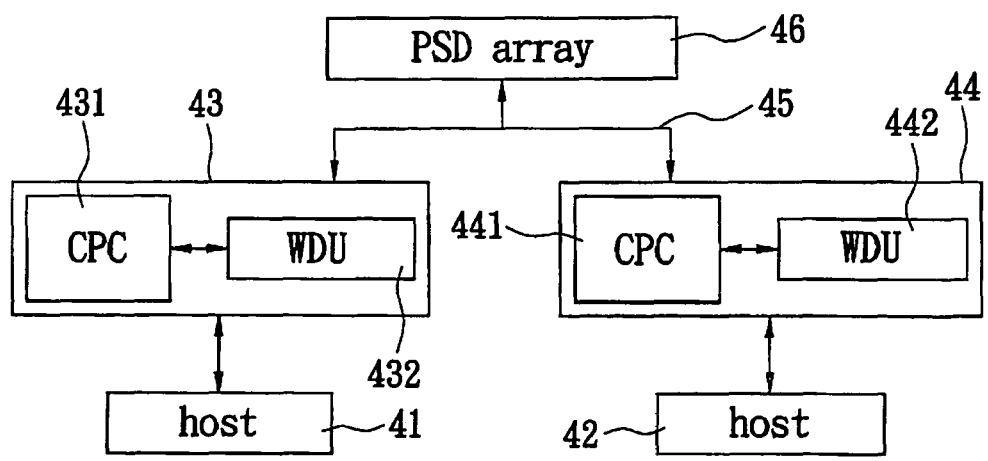
FIG. 4 is a functional block diagram of a preferred embodiment in accordance with the present invention.

Reference is made to FIG. 4, which is a functional block diagram of a preferred embodiment in accordance with the present invention. It includes hosts 41, 42, controllers 43, 44, a common transmission interconnect 45, and a PSD array 46. The controller 43 includes a central processing circuit (CPC) 431 and a watchdog unit 432. The controller 44 includes a central processing circuit (CPC) 441 and a watchdog unit 442. The PSD array 46 has multiple disks (not shown). The common transmission interconnect 45 can be an interconnect of any of the following protocols: small computer standard interface (SCSI), a fiber channel (FC), a serial ATA (SATA), a serial attached SCSI (SAS), an ATA, an internet SCSI (iSCSI) or the like.

The controllers 43, 44 mentioned above are connected to the hosts 41, 42, respectively. However, the present invention is not limited thereto. In other embodiments, each of the controllers 41, 42 can connect to at least one host directly or via a common transmission interconnect, or both can connect to the same host. The watchdog unit 432 of the controller 43 is connected to the central processing circuit 431 while the watchdog unit 442 of the controller 44 is connected to the central processing circuit 441. Both the controllers 43, 44 are connected to the PSD array 46 via the common transmission interconnect 45.

Figure 5:
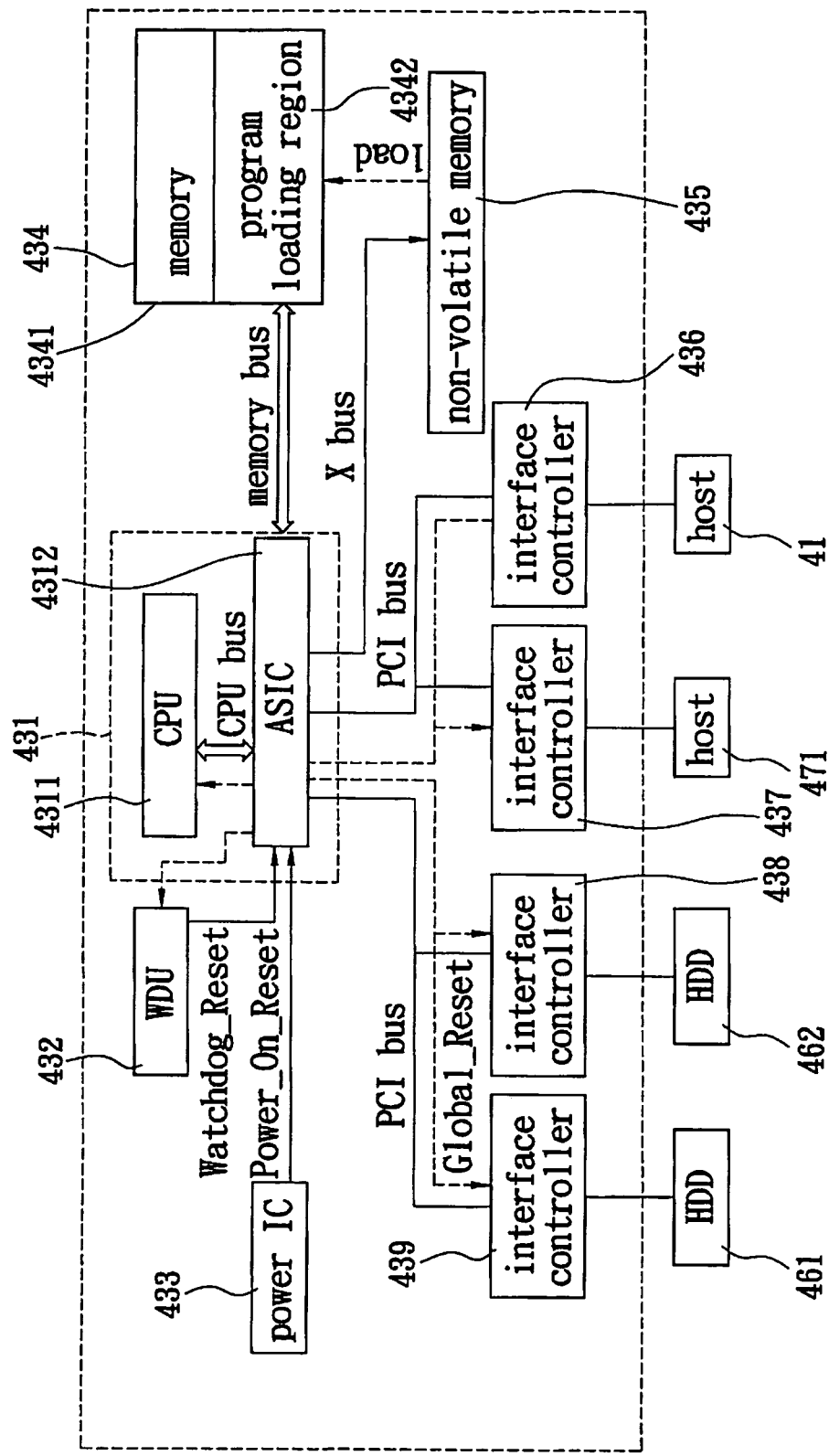
FIG. 5 is a functional block diagram of the controller in accordance with a preferred embodiment of the present invention.

Reference is made to FIG. 5, which is a diagram showing the internal functional blocks of the controller 43 in accordance with a preferred embodiment of the present invention. It includes the central processing circuit 431, the watchdog unit 432, a power IC 433, a memory 434, a non-volatile memory 435, and interface controllers 436, 437, 438 and 439. The central processing circuit 431 includes a central processing unit (CPU) 4311 and an ASIC 4312. The ASIC 4312 is a CPU chipset. The memory 434 includes a temporary data storing region 4341 and a program loading region 4342. In this embodiment, the non-volatile memory 435 is a flash memory or a read-only memory (ROM).

The power IC 433 mentioned above is connected to the ASIC 4312. The watchdog unit 432 is also connected to the ASIC 4312. The CPU 4311 is connected to the ASIC 4312 via a CPU bus. The ASIC 4312 is connected to the memory 434 via a memory bus. The ASIC 4312 is connected to the non-volatile memory 435 or other peripheral devices, such as a liquid crystal display (LCD), via an X bus. Furthermore, the ASIC 4312 is connected to the interface controllers 436, 437, 438 and 439 via a PCI bus.

In this embodiment, the interface controllers 436, 437, 438 and 439 are used to provide intercommunication between a PCI and a SCSI. However, the present invention is not limited thereto. In other embodiments, the interface controllers 436, 437, 438 and 439 can also be used to provide intercommunication between other interfaces, for example, between a PCI and a FC or between a PCI and an iSCSI. Thus, via the interface controllers 436, 437, 438 and 439, the controller 43 can connect to hard disk drives (HDDs) 461, 462, i.e., storage media, and hosts 471, 41 that have different interfaces. In the present invention, if necessary, the PCI bus and X bus mentioned above can be replaced by other kinds of buses. For example, the PCI bus can be replaced by PCI-X bus or PCI Express bus. In this situation, the interface controllers 436, 437, 438 and 439 can also be used to provide intercommunication between the PCI-X bus (or PCI Express bus) and other interfaces. Hence, the interface controllers 436, 437, 438 and 439 are basically used to provide intercommunication between two kinds of interfaces. In the present invention, the categories of the interfaces are not limited.

The ASIC 4312 mentioned above is used to assist the CPU 4311 in controlling the operation of the controller 43. The non-volatile memory 435 has a firmware program stored therein. The firmware program is used to control the controller 43. When the controller 43 is turned on, the firmware program stored in the non-volatile memory 435 is loaded into the program loading region 4342 of the memory 434. The CPU 4311 accesses and executes the firmware program temporarily stored in the program loading region 4342 via the CPU bus, the ASIC 4312, and the memory bus so as to obtain a computing result. The ASIC 4312 controls the operation of the controller 43 according to the computing result.

The power IC 433 is normally used to control the power supply of the controller 43. When the controller is shut down or has a power related problem such that the work voltage is too high or too low, or the temperature of the power IC 433 is too high, the power IC 433 sends a Power_On_Reset signal to the ASIC 4312 to shut down the controller 43. The watchdog unit 432 is used to receive the confirmation signal of the ASIC 4312 and has a time-counting function. If the watchdog unit 432 does not receive the confirmation signal from the ASIC 4312 over a predetermined period of time, the watchdog unit 432 sends a watchdog reset signal to the ASIC 4312. After the watchdog reset signal is received, the ASIC 4312 generates multiple reset signals (Global_Reset) to shut down the active components, i.e., the interface controllers 436, 437, 438 and 439, the CPU 4311 and the like. Since the interface controllers 436, 437, 438 and 439 are shut down, the controller 43 cannot communicate with the hosts 471, 41 and the hard disk drives (HDDs) 461, 462. The watchdog unit 432 is described as follows.

Figure 6:
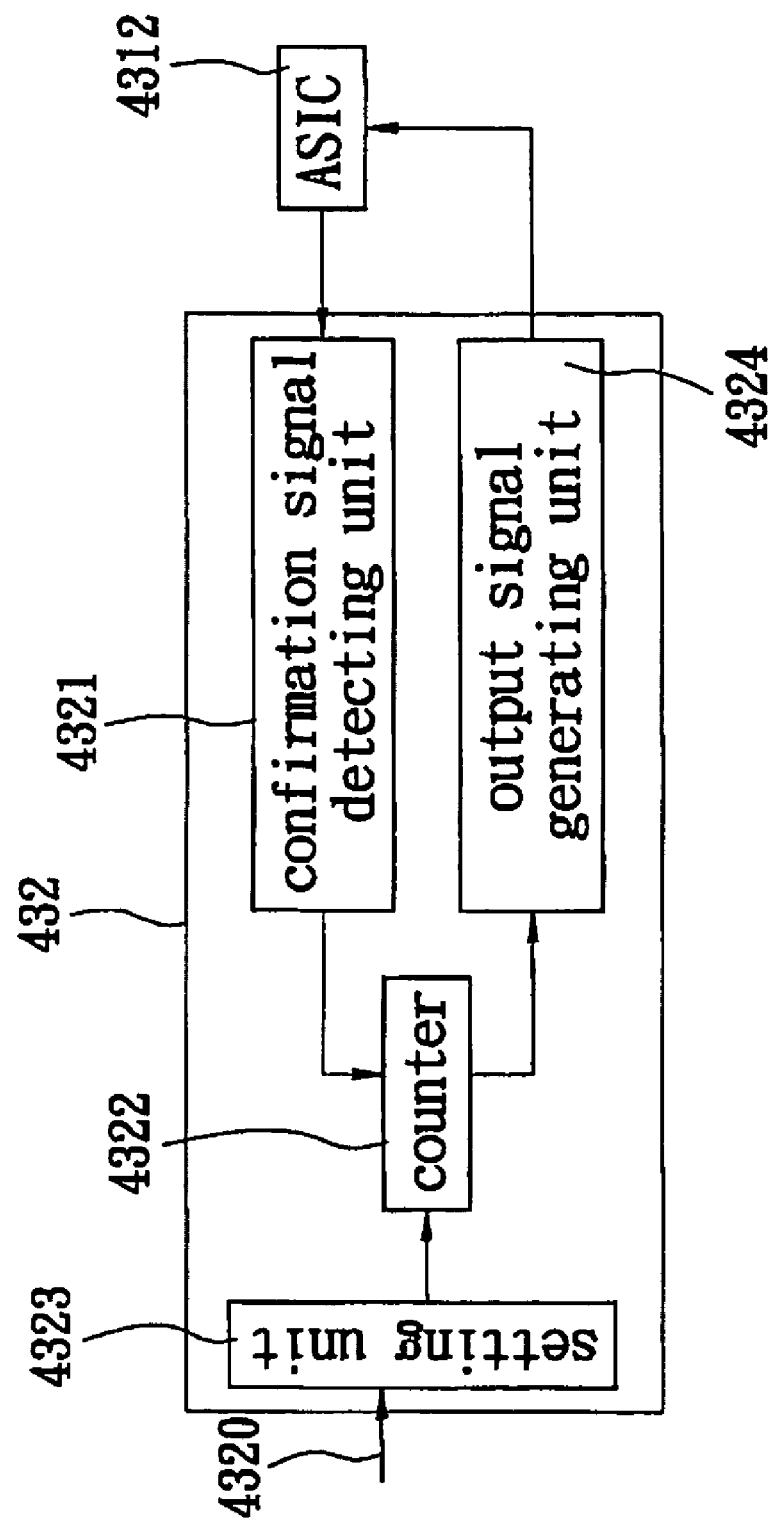
FIG. 6 is a diagram showing the internal functional blocks of the watchdog unit in accordance with a preferred embodiment of the present invention.

Reference is made to FIG. 6, which is a diagram showing the internal functional blocks of the watchdog unit in accordance with a preferred embodiment of the present invention. It includes a confirmation signal detecting unit 4321, a counter 4322, a setting unit 4323, and an output signal generating unit 4324. The counter 4322 is connected to the confirmation signal detecting unit 4321, the setting unit 4323, and the output signal generating unit 4324. The confirmation signal detecting unit 4321 is connected to the ASIC 4312 of the central processing circuit 431 to receive the confirmation signals and send a clear signal to the counter 4322. The setting unit 4323 is used to set a predetermined time period. In this embodiment, the setting unit 4323 sets the predetermined time period via multiple time-setting pins 4320. For example, if there are three time-setting pins and they all have a low voltage (0), the predetermined time period is 1 ms. The predetermined time period that can be set via the setting unit 4323 ranges from one millisecond to several tens of seconds. However, the present invention isn't limited thereto. In other embodiments, the present invention can adopt different watchdog units 432 capable of being set with a larger or smaller predetermined time period. In addition, except for using the time-setting pins, the watchdog unit 432 can use other components or methods to set the predetermined time period.

The counter 4322 is used to count time. When the controller 431 is activated, the counter 4322 also starts to count time. If the counter 4322 receives the clear signals sent from the confirmation signal detecting unit 4321, it starts to recounting time. If the counter 4322 does not receive the clear signals over a predetermined period of time, e.g., 2 ms (meaning the ASIC 4312 does not send out the confirmation signal), it sends an enable signal to the output signal generating unit 4324 such that the output signal generating unit 4324 generates a watchdog reset signal to the ASIC 4312.

In this embodiment, if the controller operates normally, the ASIC 4312 periodically sends out confirmation signals with time spacing smaller than the predetermined time period. For example, the time spacing can be 1.5 ms and the predetermined time limit can be 2 ms. The confirmation signals are sent to the confirmation signal detecting unit 4321 of the watchdog unit 432. When the confirmation signal detecting unit 4321 receives the confirmation signal, it send a clear signal to have the counter 4322 recount time.

When the controller 431 operates abnormally, e.g., the computing result of the CPU 4312 is erroneous so that the ASIC 4312 is unable to send the confirmation signal to the watchdog unit 432, or the ASIC 4312 fails and is impeded by other reasons so that it is unable to send the confirmation signal or it generates a non-confirmation signal to the watchdog unit 432, the watchdog unit 432 sends a watchdog reset signal to the ASIC 4312 after the predetermined time period is exceeded. Then, the ASIC 4312 generates multiple reset signals (Global_Reset) to shut down the active components of the controller 43, i.e., the interface controllers 436, 437, 438 and 439 and the CPU 4311, to cut off the communication connection of the controller 43 to the hosts 471, 41 and the hard disk drives 461, 462. For another controller 44, the central processing circuit 441 and the watchdog unit 442 have the operations similar to that mentioned above and hence is not described in detail here.

Figure 7:
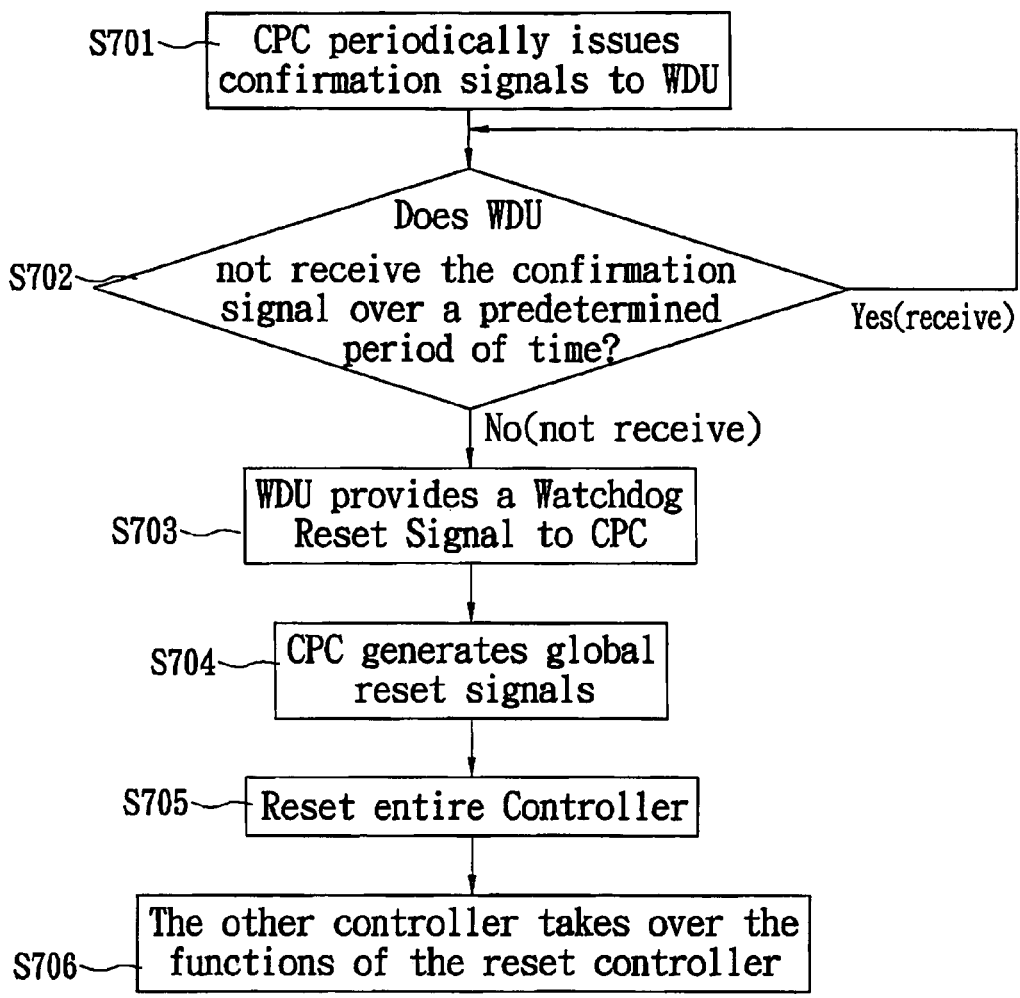
FIG. 7 is an operative flowchart of a preferred embodiment in accordance with the present invention.

Reference is made to FIGS. 4-5 together with FIG. 7, which is an operative flowchart of a preferred embodiment in accordance with the present invention. For convenience of description, the controllers 43, 44 are arranged in the Active-Active configuration and only the operation of the controller 43 is detailed. First, the central processing circuit 431 periodically sends out a confirmation signal to the watchdog unit 432. For example, the central processing circuit 431 sends the confirmation signal to the watchdog unit 432 at 1.5 ms intervals (step S701). If this embodiment, if the controller 43 operates normally, the central processing circuit 431 periodically generates the confirmation signal and delivers it to the watchdog unit 432.

Therefore, this embodiment uses the watchdog unit 432 to count time (the predetermined time period can be, for example, 2 ms, to determine whether the central processing circuit 431 sends out the confirmation signals within the predetermined period of time, i.e., to determined whether the watchdog unit 432 receives the confirmation signals within the predetermined period of time (step S702). If the watchdog unit 432 receives the confirmation signals within the predetermined period of time, it starts a time recounting action and continues the process of determining whether the watchdog unit 432 receives the confirmation signals from the central processing circuit 431 within the predetermined period of time in step S702. If the watchdog unit 432 does not receive the confirmation signals over the predetermined period of time, it means the controller 43 operates abnormally and the watchdog unit 432 sends a watchdog reset signal to the central processing circuit 431 (step S703).

When the central processing circuit 431 receives the watchdog reset signal from the watchdog unit 432, it sends multiple reset signals (Global_Reset) to the active components, i.e., the interface controllers 436, 437, 438 and 439, the CPU 4311 and the like, to shut down the entire controller 43 and its connection to the system (steps S704, S705).

The controllers 43, 44 respectively have the watchdog units 432, 442 for self-monitoring. In addition, the controllers 43, 44 also send monitoring signals to each other so each can determine whether its counterpart is still operating normally. In this embodiment, since the controllers 43, 44 already have the watchdog units 432, 442 for performing the self-monitoring function, the monitoring signals to the counterpart controller, 442 are sent with larger time spacing, e.g., several tens of milliseconds. Moreover, the monitoring signals can be simpler and are used only to inquire whether the counterpart controller is operating normally. Thus, the bandwidth of the common transmission interconnect 45 occupied by such monitoring signals is reduced.

As described above, the controllers 43, 44 send monitoring signals to each other so each can determine whether its counterpart is still operating normally. Hence, the controller 44 periodically sends a monitoring signal to the controller 43. The time interval can be 15 ms. Since the controller 43 has been shut down in Step S705 and thus does not reply to the monitoring signal, the controller 44 takes over the functions of the controller 43 (step S706) until the controller 43 is restored or replaced by a new one. Of course, this is also true when the controllers 43, 44 are arranged in the Active-Standby configuration.

To sum up, the controllers of the present invention use the watchdog units to achieve the self-monitoring function. When any one of the controllers operates abnormally, it automatically cuts off all of its connections to other units of the system right away. In this way, the controllers don't need to send the monitoring signals to each other so frequently and thereby the number of the monitoring signals needing to be transferred by the common transmission interconnect is decreased. Hence, the bandwidth of the common transmission interconnect occupied by the monitoring signals is reduced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A redundant storage system having a self-monitoring function, the redundant storage system comprising:

a plurality of controllers, each performing the self-monitoring function via a self-monitoring device, wherein the self-monitoring device comprises a self-monitoring operating circuit and a watchdog unit; and at least one common transmission interconnect connected to the controllers;

wherein, in one of the controllers, when the one controller is failed, a first self-monitoring device generates a first output signal, and said one controller is shut down in response to the first output signal;

wherein the self-monitoring operating circuit periodically sends a confirmation signal to the watchdog unit in order to determine whether or not the one controller is failed, and the watchdog unit recounts time if the watchdog unit receives the confirmation signal within a predetermined period of time; and wherein the watchdog unit comprises:

a confirmation signal detecting unit connected to the self-monitoring operating circuit for receiving the confirmation signal and for generating a clear signal in response to the confirmation signal;

an output signal generating unit for generating the first output signal when said watchdog unit of said one controller does not receive the confirmation signal sent from said self-monitoring operating circuit over the predetermined period of time; and a counter connected to the confirmation signal detecting unit and the output signal generating unit for counting the predetermined period of time.

2. The redundant storage system as claimed in claim 1, wherein when said watchdog unit of said one controller does not receive the confirmation signal sent from said self-monitoring operating circuit over the predetermined period of time, said watchdog unit provides the first output signal to the self-monitoring operating circuit to shut down said one controller.

3. The redundant storage system as claimed in claim 1, wherein said self-monitoring operating circuit of said one controller generates a plurality of reset signals to shut down said one controller after receiving the first output signal.

4. The redundant storage system as claimed in claim 1, wherein the controllers comprises a first controller and a second controller, the second controller periodically sends a monitoring signal to the first controller to check a state of the first controller, and the second controller takes over functions of the first controller if the first controller is shut down.

5. The redundant storage system as claimed in claim 1, wherein the controllers connect to at least one storage medium.

6. The redundant storage system as claimed in claim 1, wherein the common transmission interconnect is one the following interconnects: a small computer standard interface (SCSI) interconnect, a serial ATA (SATA) interconnect, a serial attached SCSI (SAS) interconnect, an Internet SCSI (iSCSI) interconnect, and a fiber channel (FC) interconnect.

7. The redundant storage system as claimed in claim 1, wherein said self-monitoring device comprises a counter for generating the first output signal.

8. A redundant storage system having a self-monitoring function, the redundant storage system comprising:
a plurality of controllers, wherein each of said controllers comprises a self-monitoring operating circuit and a watchdog unit for performing the self-monitoring function, and each of the self-monitoring operating circuits periodically sends a confirmation signal to a corresponding watchdog unit in order to determine whether or not the corresponding controller is failed; and
at least one common transmission interconnect connected to the controllers; wherein when the watchdog unit of one of said controllers does not receive the confirmation signal sent from a corresponding self-monitoring operating circuit of said one controller over a predetermined period of time, said watchdog unit provides a first output signal to said corresponding self-monitoring operating circuit to shut down said one controller, and said watchdog unit recounts time when the watchdog unit of one of said controllers receives the confirmation signal sent from a corresponding self-monitoring operating circuit of said one controller within the predetermined period of time; and
wherein the watchdog unit of one of said controllers comprises:
a confirmation signal detecting unit connected to said corresponding self-monitoring operating circuit for receiving said corresponding confirmation signal and for generating a clear signal in response to the confirmation signal;
an output signal generating unit for generating the first output signal when the watchdog unit of said one controller does not receive the confirmation signal sent from said self-monitoring operating circuit over the predetermined period of time; and
a counter connected to the confirmation signal detecting unit and the output signal generating unit for counting the predetermined period of time.

9. The redundant storage system as claimed in claim 8, wherein said self-monitoring operating circuit of said one controller generates a plurality of reset signals to shut down said one controller after receiving the first output signal.

10. The redundant storage system as claimed in claim 8, wherein the controllers comprises a first controller and a second controller, the second controller periodically sends a monitoring signal to the first controller to check a state of the first controller, and the second controller takes over functions of the first controller if the first controller is shut down.

11. The redundant storage system as claimed in claim 8, wherein the common transmission interconnect is one the following interconnects: a small computer standard interface (SCSI) interconnect, a serial ATA (SATA) interconnect, a serial attached SCSI (SAS) interconnect, an Internet SCSI (iSCSI) interconnect, and a fiber channel (FC) interconnect.

12. A controller having a self-monitoring function for using in a storage system, said storage system having a second controller, at least one host, and at least one storage medium, the controller being connected to the second controller via a common transmission interconnect, the controller comprising:
a watchdog unit for counting a predetermined period of time; and
a self-monitoring operating circuit connected to the watchdog unit for periodically sending a confirmation signal to the watchdog unit in order to determine whether or not the controller is failed;
wherein if the watchdog unit does not receive the confirmation signal over the predetermined period of time, the watchdog unit provides a first output signal to the self-monitoring operating circuit to shut down the controller, and the watchdog unit recounts time if the watchdog unit receives the confirmation signal within the predetermined period of time; and
wherein the watchdog unit comprises:
a confirmation signal detecting unit connected to the self-monitoring operating circuit for receiving the confirmation signal and for generating a clear signal in response to the confirmation signal;
an output signal generating unit for generating the first output signal when the watchdog unit of the controller does not receive the confirmation signal sent from said self-monitoring operating circuit over the predetermined period of time; and
a counter connected to the confirmation signal detecting unit and the output signal generating unit for counting the predetermined time period.

13. The controller as claimed in claim 12, wherein the self-monitoring operating circuit generates a plurality of reset signals to shut down the controller after receiving the first output signal.

14. The controller as claimed in claim 12, wherein the controller periodically sends a monitoring signal to the second controller to check a state of the second controller, and the controller takes over functions of the second controller if the second controller is shut down.

15. The controller as claimed in claim 12, wherein the common transmission interconnect is one the following interconnects: a small computer standard interface (SCSI) interconnect, a serial ATA (SATA) interconnect, a serial attached SCSI (SAS) interconnect, an Internet SCSI (iSCSI) interconnect, and a fiber channel (FC) interconnect.

16. The controller as claimed in claim 12, wherein if the counter receives the clear signal sent from the confirmation signal detecting unit, the counter recounts time; and if the counter does not receive the clear signal sent from the confirmation signal detecting unit over the predetermined time period, the counter sends an enable signal to the output signal generating unit to generate the first output signal.

17. A self-monitoring method of a controller, the controller having a self-monitoring operating circuit and a watchdog unit, the self-monitoring method comprising the steps:

the self-monitoring operating circuit sending a confirmation signal to the watchdog unit periodically in order to determine whether or not the controller is failed;

the watchdog unit counting a predetermined period of time, wherein the watchdog unit sends a first output signal to the self-monitoring operating circuit if the watchdog unit does not receive the confirmation signal over the predetermined period of time, and the watchdog unit recounts time if the watchdog unit receives the confirmation signal within the predetermined period of time; and the self-monitoring operating circuit generating a plurality of reset signals in response to the first output signal to shut down the controller; and wherein the watchdog unit comprises:

a confirmation signal detecting unit connected to the self-monitoring operating circuit for receiving the confirmation signal and for generating a clear signal in response to the confirmation signal;

an output signal generating unit for generating the first output signal when the watchdog unit of the controller does not receive the confirmation signal sent from said self-monitoring operating circuit over the predetermined period of time; and a counter connected to the confirmation signal detecting unit and the output signal generating unit for counting the predetermined period of time.

18. The self-monitoring method as claimed in claim 17, wherein, in the step of the self-monitoring operating circuit sending a confirmation signal, if the watchdog unit receives the confirmation signal within the predetermined period of time, the watchdog unit checks again whether the watchdog unit receives another confirmation signal from the self-monitoring operating circuit within the predetermined period of time or not.

19. A self-monitoring method for using in a redundant storage system having a plurality of controllers, the controllers being connected to at least one storage medium, each of the controllers having a self-monitoring operating circuit and a watchdog unit, the self-monitoring method being applied to each of the controllers and comprising the steps:

the self-monitoring operating circuit sending a confirmation signal to the watchdog unit periodically in order to determine whether or not the corresponding controller is failed;

the watchdog unit counting a predetermined period of time, wherein the watchdog unit sends a first output signal to the self-monitoring operating circuit if the watchdog unit does not receive the confirmation signal over the predetermined period of time, and the watchdog unit recounts time if the watchdog unit receives the confirmation signal within the predetermined period of time;

the self-monitoring operating circuit generating a plurality of reset signals in response to the first output signal to shut down the controller; and wherein the watchdog unit comprises:

a confirmation signal detecting unit connected to the self-monitoring operating circuit for receiving the confirmation signal and for generating a clear signal in response to the confirmation signal;

an output signal generating unit for generating the first output signal when the watchdog unit of the controller does not receive the confirmation signal sent from the self-monitoring operating circuit over the predetermined period of time; and a counter connected to the confirmation signal detecting unit and the output signal generating unit for counting the predetermine time period.

20. The self-monitoring method as claimed in claim 19, wherein, in the step of the self-monitoring operating circuit sending the confirmation signal, if the watchdog unit receives the confirmation signal within the predetermined period of time, the watchdog unit checks whether the watchdog unit receives another confirmation signal from the self-monitoring operating circuit within the predetermined period of time or not.

21. The self-monitoring method as claimed in claim 19, further comprising: a step of using another controller to take over functions of the controller if the controller is shut down.

22. The self-monitoring method as claimed in claim 21, wherein, in the controller taking-over step, said another controller sends a monitoring signal to said controller to check whether the corresponding controller is shut down, and if no response is replied indicating said controller is normal, said another controller takes over the functions of said controller.

23. The self-monitoring method as claimed in claim 19, wherein the common transmission interconnect is one the following interconnects: a small computer standard interface (SCSI) interconnect, a serial ATA (SATA) interconnect, a serial attached SCSI (SAS) interconnect, an Internet SCSI (iSCSI) interconnect, and a fiber channel (FC) interconnect.

24. A redundant storage system, comprising:

at least one host;

a plurality of controllers connected to the host; and a PSD array connected to the controllers via a common transmission interconnect;

wherein each of the controllers has a self-monitoring operating circuit and a watchdog unit;

the self-monitoring operating circuit periodically sends a confirmation signal to the watchdog unit in order to determine whether or not the corresponding controller is failed;

if the watchdog unit does not receive the confirmation signal over a predetermined period of time, the watchdog unit provides a first output signal to the self-monitoring operating circuit to shut down the corresponding controller; and if the watchdog unit receives the confirmation signal within the predetermined period of time, the watchdog unit recounts time;

wherein the watchdog unit comprises:

a confirmation signal detecting unit connected to the self-monitoring operating circuit for receiving the confirmation signal and for generating a clear signal in response to the confirmation signal;

an output signal generating unit for generating the first output signal when the watchdog unit of the controller does not receive the confirmation signal sent from the self-monitoring operating circuit over the predetermined period of time; and a counter connected to the confirmation signal detecting unit and the output signal generating unit for counting the predetermined time period.

25. The redundant storage system as claimed in claim 24, wherein the watchdog unit further comprises:

a setting unit for setting the predetermined time period.

* * * * *